United States Patent [19]

Balbes et al.

[11] Patent Number: 4,538,175
[45] Date of Patent: Aug. 27, 1985

[54] RECEIVE ONLY EARTH SATELLITE GROUND STATION

[75] Inventors: Michael S. Balbes; Charles E. Day; Robert L. Hooper; Hank S. Lin, all of Ocala, Fla.

[73] Assignee: Microdyne Corporation, Ocala, Fla.

[21] Appl. No.: 168,665

[22] Filed: Jul. 11, 1980

[51] Int. Cl.³ .............................................. H04N 7/10
[52] U.S. Cl. ..................... 358/86; 343/786; 343/840; 455/12
[58] Field of Search ........ 343/756, 786, 840, 781 CA; 358/86; 455/3, 12

[56] References Cited

U.S. PATENT DOCUMENTS

| 3,287,729 | 11/1966 | Mark et al. | 343/786 |
| 3,707,597 | 12/1972 | Lunn | 358/165 |
| 3,832,717 | 8/1974 | Taggart, Jr. | 343/840 |
| 3,931,624 | 1/1976 | Hundley et al. | 343/840 |
| 3,938,157 | 2/1976 | Brickley | 343/756 |
| 4,145,716 | 3/1979 | Uemura et al. | 455/3 |

FOREIGN PATENT DOCUMENTS 1918084 10/1970 Fed. Rep. of Germany ...... 343/840

OTHER PUBLICATIONS

McClannan et al.-A Satellite System for CATV-Proc. IEEE, vol. 58, #7 Jul. 1970, pp. 987-1001.

*Primary Examiner*—Joseph A. Orsino, Jr.
*Attorney, Agent, or Firm*—Howard L. Rose

[57] ABSTRACT

A receive only, low cost, small size, frequency agile earth satellite ground station has the low noise amplifier, frequency agile receiver, head end modulator, motor control circuit and optional signal unscrambler disposed on circuit boards about a variable polarization antenna-to-low noise amplifier feed which together with the motor for controlling the feed polarization of the feed are all located in a weather insulating cannister at the focal point of the system antenna whereby the only elements of the system not located in the cannister are the antenna and a cable connected control console employed to select a desired channel and to select local or satellite reception located at the TV set. A motor control is provided which senses odd-or-even least significant bit of binary coded channel selection signals to determine if the feed polarization, control motor must be energized.

20 Claims, 9 Drawing Figures

RECEIVE ONLY EARTH SATELLITE GROUND STATION

RELATED APPLICATIONS

This application is related to copending application, Ser. No. 168,666, filed on July 11, 1980 in the name of Tore N. Anderson for Polarization Rotatable Antenna Feed now U.S. Pat. No. 4,375,052, issued Feb. 22, 1983; to copending application, Ser. No. 168,668, filed on July 11, 1980 in the name of Keith B. Nicholson for Signal Scrambler System now U.S. Pat. No. 4,387,393, issued June 7, 1983; and copending application, Ser. No. 168,667, filed July 11, 1980 in the name of Robert L. Hooper for Frequency Agile Receiver now U.S. Pat. No. 4,429,418, issued Jan. 31, 1984.

BACKGROUND OF THE INVENTION

The present invention relates to a receive only, earth satellite ground station and more particularly to a low cost, earth satellite ground station wherein an antenna to low noise amplifier variable polarizing feed, a low noise amplifier, frequency agile receiver including tuner, demodulator and signal separator and head end modulator are all located in a cannister supported at the focal point of the ground station antenna.

As the cost of integrated circuit chips has reduced dramatically and the availability of special function circuits produced for mass markets has increased, the overall costs associated with even highly complex electronic equipment has been reduced such as to open up markets not contemplated just a few years ago. One such market is private earth satellite communications systems having only a few transmit-receive stations and a plurality of receive only stations. Such systems are presently being contemplated by religious organizations and some of the larger industrial concerns for transmitting voice and picture religious services in the former case and instructional materials in the latter case.

Also, as the costs of such receivers are further reduced, the home TV market begins to become attractive and a test of this market is currently being conducted in Canada.

There are presently two types of commercial satellites in orbit which are used for TV relay. They are the Western Union Satellites and the RCA Satellites. While both operate in the same general frequency bands, the Western Union Satellites have twelve transponder bands each 40 MHz wide and each having a center frequency separation of 40 MHz, while the RCA Satellites have 24 transponder bands each 40 MHz wide, but separated by 20 MHz. RCA is able to accomplish this by utilizing frequency re-use or cross polarization. Basically, this configuration consists of 12 transponders having their signals transmitted in the vertically polarized mode and 12 horizontally polarized with each adjacent transponder signal being transmitted in the oppositely polarized mode. The system of the present invention is concerned with the RCA system since it provides 24 channels of communications at substantially no additional cost over the Western Union system at least at the receiver.

Continuing with a description of the basics of either system, the satellite receives the nominal 6 GHz signal transmitted from the uplink terminal, translates it to a nominal 4 GHz signal and retransmits it back to the ground in a beam shaped to cover the geographic area of interest, for instance, the United States.

The signal transmitted back to the ground is received by the down link terminal which is the part of the communications chain of interest in the present invention. The down link chain consists primarily of an antenna and one or more low noise amplifiers, receivers and head end modulators. In presently available systems each of these elements is a separate entity with its own power supply, chassis, etc. which are spread out and interconnected by cables. These systems are relatively expensive and due to losses inherent in the cabling, require high gain stages, AGC, etc.

Various types of antennas are available, i.e. paraboloidal with feed at the focal point, Cassegrain and conical horn. The paraboloid antenna is of primary concern herein although the conical horn may be employed. The receiver in systems of the type under consideration is critical to system performance. Due to the desire for low cost, relatively small antennas must be employed (5 meters or less) and in consequence, the C/N ratios are not as large as may be desirable. Thus, many requirements are placed on the receiver performance and characteristics that would not otherwise be encountered or required in systems providing higher C/N ratios. If the nominal desirable threshhold for an FM receiver with a 30–36 MHz IF bandwith is approximately 10–11 dB C/N, problems are encountered at the edges of the EIRP Footprint where such a ratio is not available. Some manufacturers employ threshhold extension techniques to overcome the problem but they increase system complexity and cost and do not overcome the black and white "sparkle" problem resulting from "impulse noise."

SUMMARY OF THE INVENTION

The present invention utilizes various important features to achieve the desired result of a low cost, small size, high performance, receive only earth satellite ground station.

The system preferrably employs a paraboloidal antenna with the feed, the low noise amplifier (LNA), the receiver, optional signal unscrambler and the head end modulator and a motor and motor control circuit all located in the antenna with the receiver head end modulator, unscrambler and motor control components mounted on circuit boards disposed about the antenna feed. The antenna feed to the LNA includes a low-loss polarization section, which permits carriers of both horizontal and vertical polarization to be fed to a single LNA located at the end of the feed; the output of the LNA being coupled to the receiver located only inches away. The aforesaid components are all located within a housing for protection from heat and weather; the housing being supported at the focal point of the antenna by struts and being readily removable to permit unit replacement in the event of a requirement for repair.

The housing is comprised of a sealed cannister with a vented outer shell which is plastic to reduce heat transmission. Air is permitted to circulate freely between the wall of the cannister and the outer shell to further facilitate cooling; the inner wall providing environmental protection as well as shielding against interference from internal and external radiated electric and magnetic fields.

The aforesaid combination of polarization in the feed permitting use of a single LNA and the provision of the receiver and head end modulator disposed about the feed at the antenna provides a system requiring considerably less gain prior to input to the receiver than in the prior art systems where various of these elements are located remote from one another and must be interconnected by bulky cables which introduce losses. The signal to noise ratio is maintained at highly acceptable levels without the use of exotic and costly circuits and techniques. Further, since satellite signals vary little in level and with the LNA, receiver and head end modulator located about the feed on the antenna, little signal variation is introduced from external effects, AGC is not required and gain is preserved, i.e. high S/N ratios are maintained at relatively little cost.

The output of the head end modulator is in a form such that the signal may be applied directly to a TV receiver over a standard coaxial cable; the installation receiving its d.c. power for operation of the electronics and frequency (channel) selection from an in-house control unit over separate leads of the cable. The d.c. power is also provided to a controller for a stepper motor utilized in the polarizing section of the feed as is described in detail subsequently. The structure of the polarizing section of the feed forms the subject matter of copending application Ser. No. 168,666 now U.S. Pat. No. 4,375,052 filed on concurrent date herewith in the name of Tore N. Anderson for Polarization Rotatable Antenna Feed and assigned to the same assignee as the present invention.

The tuner of the receiver of the present invention forms the subject matter of copending application Ser. No. 168,667 now U.S. Pat. No. 4,387,393 filed on concurrent date herewith in the name of Robert L. Hooper for Frequency Agile Receiver and assigned to the same assignee as the present invention. The receiver is required to reduce the frequency of the incoming signals, 3.72 to 4.18 GHz, to 70 MHz and utilizes several novel techniques to minimize the maximum frequency required of the local voltage controlled oscillator. As a result, several distinct cost advantages are achieved without loss of system performance; an important consideration in the system of this invention.

The head end modulator utilizes the same basic circuit as the tuner to establish the frequency of the frequency modulated audio subcarrier except that the former is not tunable. Specifically, a CB synthesizer chip is employed to establish the audio subcarrier for application to the TV receiver.

A motor control circuit for varying the receiver feed to accommodate signals of different polarization is provided. As indicated above, alternate channels are of the same polarization and adjacent channels are of different polarization. Thus, all odd number channels have the same polarization and even number channels have the same polarization, but the two groups have different polarizations. The proper polarization is selected by investigating whether the selected channel is odd or even. The motor is rendered unresponsive to change of channel until a switch is actuated indicating the selection process has been completed otherwise the motor would be oscillating back and forth as the channel selector passes each channel upon rotation of the selection wheel, knob, dial, etc. A video squelch is provided during motor operation.

It is often desirable in special applications of the systems designed for the markets being addressed herein to add a scrambler system. This feature forms the subject matter of copending application Ser. No. 168,668 now U.S. Pat. No. 4,429,418 filed on concurrent date herewith in the name of Keith B. Nicholson for Signal Scrambler System and assigned to the same assignee of the present invention. Unscrambling is provided according to said application by reversing the polarity of the transmitted signal. The received signal is unscrambled at RF frequencies by a control preceding the receiver demodulator which control when activated applies a d.c. control signal to a set of pin diodes to effectively invert the IF signal to the demodulator.

It is a primary object of the present invention to provide a low cost, receive only, frequency agile earth satellite ground station.

It is another object of the present invention to provide an earth satellite ground station wherein the r.f. feed, low noise amplifier, remotely tunable receiver and head end modulator are located in a housing supported by struts at the focal point of a paraboloidal dish antenna.

Yet another object of the present invention is to provide an earth satellite ground station for receiving horizontally and vertically polarized satellite transmitted carriers wherein the waves are rotatable into a common plane in the antenna feed whereby the received carrier signal may be applied to a single low noise amplifier located on the antenna.

Another object of the present invention is to provide a receive only earth satellite ground station wherein the LNA, receiver signal unscrambler, head end modulator, motor for changing polarization of the antenna to LNA feed, and motor control circuit are located in a weather shielding cannister supported by struts at the focal point of the systems antenna with the circuits located on circuit board disposed about the antenna feed.

It is still another object of the invention to provide a motor control circuit for a stepping motor that changes the polarization of the receiver feed.

Yet another object of the present invention is to provide a head end modulator of inexpensive construction but effective operation.

Certain embodiments of this invention will now be described by reference to the accompanying drawings wherein:

DETAILED DESCRIPTION OF THE PREFERRED EMBODIMENT

Figure 1:
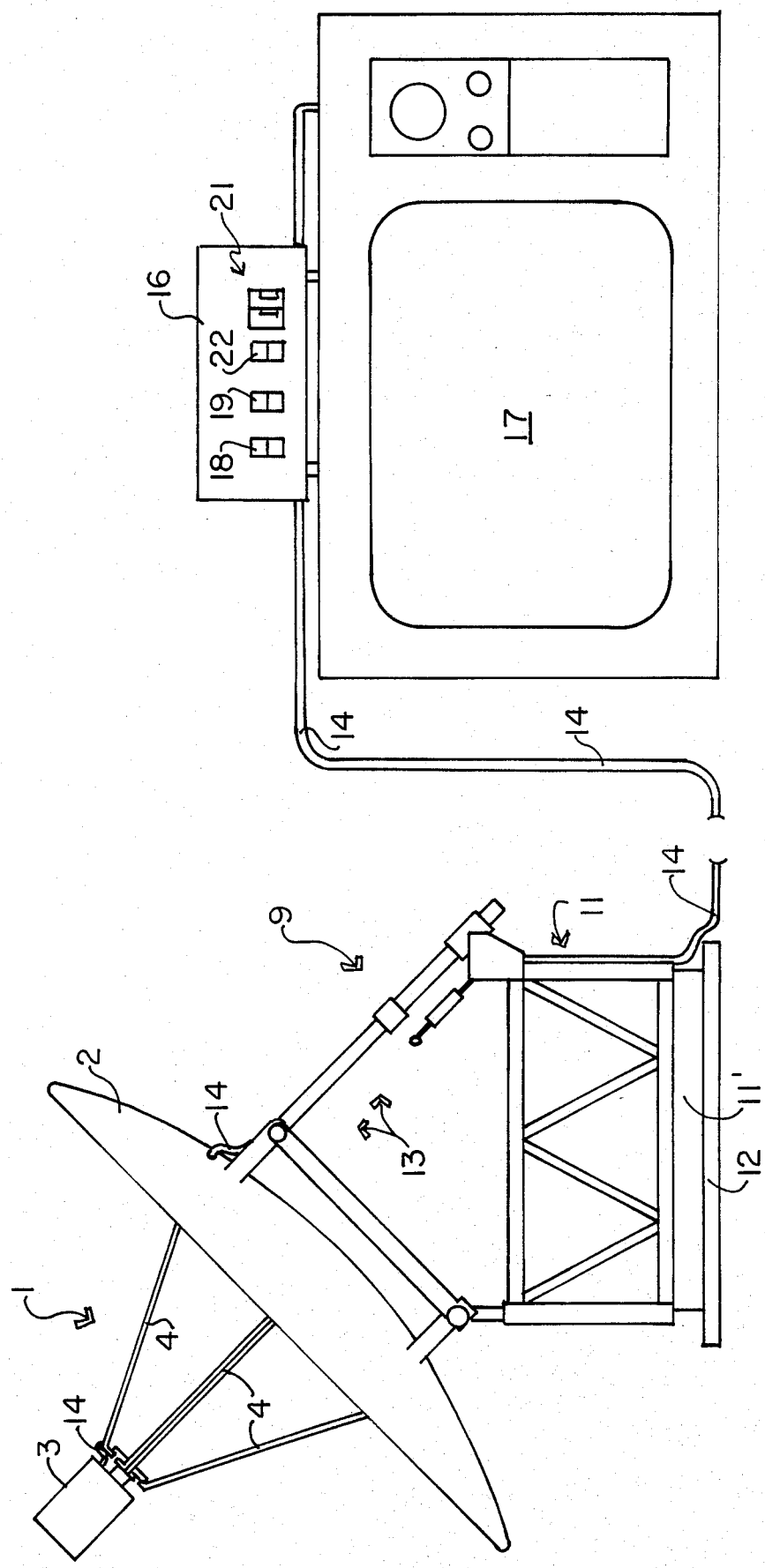
FIGS. 1A and 1B combine to provide a diagramatic external view of the arrangement of the major elements of the system of the invention.
Figure 2A:
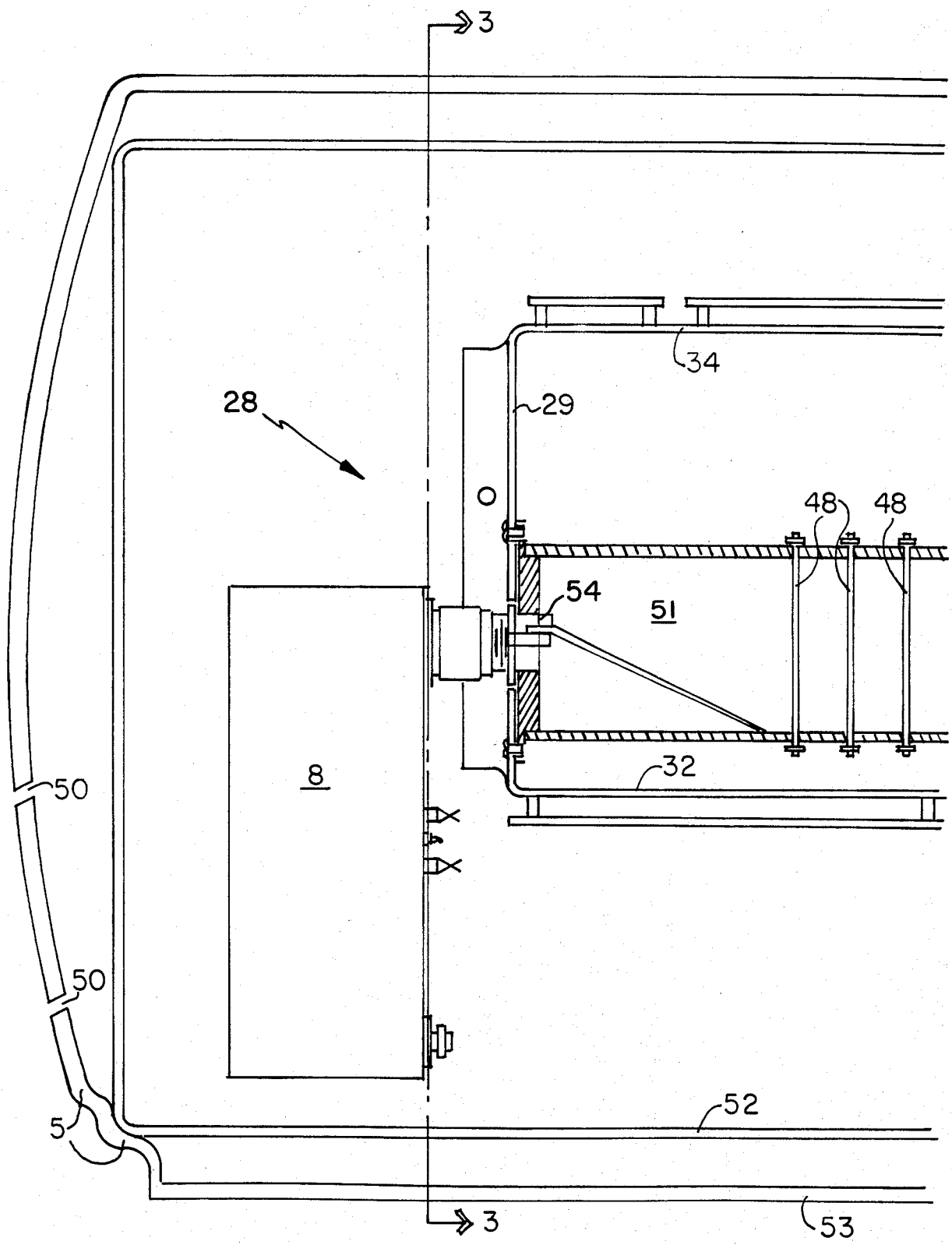
FIGS. 2A and 2B combined are a view in cross-section of the housing at the focal point of the antenna and the interior arrangement of the feed, the low noise amplifier and circuit boards of the receiver.
Figure 2B:
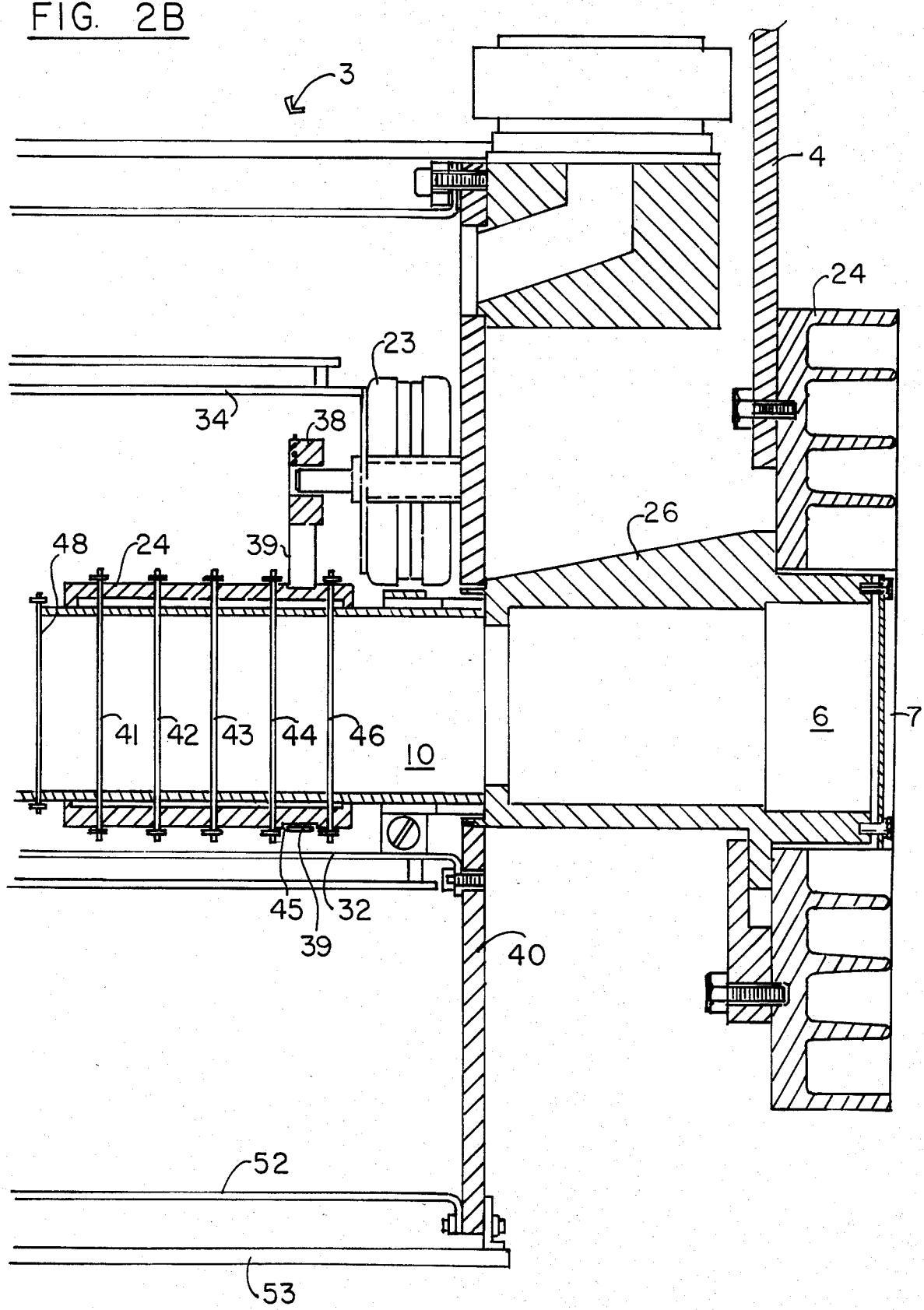

Referring now specifically to FIGS. 1 and 2 of the accompanying drawings, there is illustrated an earth satellite, receive only, ground station generally designated by the reference numeral 1, utilizing a paraboloidal dish or antenna 2 which for weight and cost considerations, is fabricated from fiber glass. Located at the focal point of the antenna 2 is a housing designated by the reference numeral 3 supported by struts 4 extending upwardly from the dish 2. The housing 3 houses feed 6 (refer to FIG. 2 of the accompanying drawings); the entry to which is covered by a plastic window 7; and a motor 23. The housing 3 further houses a wave guide 10 low noise amplifier 8, a frequency agile receiver, a motor control circuit, unscrambler and a head end modulator all of which are not designated by reference numerals in FIG. 2 except LNA 8 and wave guide 10 since they are composed of elements on numerous circuit boards located within the housing 3 and are discussed in detail with reference to other figures of the accompanying drawings.

The antenna 2 is mounted on a structure generally designated by the reference numeral 9 consisting of a base 11 mounted on a concrete slab 12. A mechanism 13 permits control of dip or vertical angle of the dish so that it may be aimed at the satellite while a rotary base 11' permits horizontal alignment of the antenna. A cable 14 connects the electronics at the antenna to a control console designated by the reference numeral 16 which controls application of d.c. and control signals to the antenna sight and of the signal to a TV set or monitor 17. The console has a first switch 18, used to select either standard broadcast reception for the TV 17, or satellite reception. It is also provided with an on-off switch 19 for obvious reasons and a channel selector mechanism 21 illustrated as two thumb wheels for entering the desired channel as two separate numbers such as channel 24 where the left number is entered as a 2 and the right number is entered as a 4. The thumb wheels control the input to a binary coded decimal generator; its output being transmitted over leads 20 to a memory 25 at the antenna for subsequent distribution to the tuner and to motor controls of the receiver. After the channel has been selected, the actual entry of the information is affected by pressing an entry control switch 22 which transfers the information in the memory 25 to the tuner and the motor control 30. The reason for this latter feature will become apparent upon a subsequent discussion of the control system at the antenna.

In the system illustrated in FIGS. 1 and 2, the operator may select the type of transmission to be received and, if in fact, satellite transmission is selected, the channel desired is dialed and then the button 22 pressed to enter the channel selection into the receiver and motor control. The important feature of the arrangement of FIG. 1, is that all of the reception, demodulation and remodulation of the satellite signal occurs at the antenna. The low noise amplifier is positioned at the end of the feed and the receiver elements are disposed below and within the housing 3 so that the leads from the low noise amplifier to the receiver are of absolute minimum length. In consequence of this and other features as will be described in detail subsequently, a strong low noise signal is developed on the cable 14, without requiring exotic components or expensive techniques. In further consequence, a system is provided which may be installed and completely wired and set into operation for relatively low cost in comparison with the complexity of the problems presented and requirements of the system.

Referring now specifically to FIG. 2 of the accompanying drawings, the housing 3 contains a stepper motor 23, for driving a collar 40, to control the rotation of the incoming carrier whereby to insure that the carrier, when presented to the low noise amplifier 8, is of the proper polarization.

The housing 3 includes a base plate 40 connected via a hollow cylindrical transformer 26 in which is secured at the end, remote from the base plate 40, the feed 6 covered by the plastic window 7. The member 26 is suitably secured to a side lobe suppressor in turn secured to the struts 4, illustrated in FIG. 1, to provide for the total support of the system of the housing 3 with the window 7 at the focal point of the antenna. Located interiorly of an outer cylindrical metal wall 53 is a metal can 52, a top view along line 3—3 being presented in FIG. 3 of the accompanying drawings. The can is provided with a left end wall 29 on which is supported the LNA 8. Also secured to the wall 29 is one end of the wave guide 10, the other end of which is supported on plate 40 with the hollow interior of guide 10 forming a continuation of the transformer section 26 of the antenna. Can 28 has four side walls designated in FIG. 3 as 31, 32, 33, and 34 which fully enclose the feed member 26 and on the outside of which are mounted various PC boards of the receiver, head end modulator, motor control and unscrambler. The mounting of the tuner board is of particular concern due to the low level of the signals being received and the desire to isolate the board from extraneous signals. The tuner board which is designated by reference numeral 36, is located in effect in an enclosure provided by the sides 31 and 33 extending beyond the wall 32 and a cover 37 which extends between the walls 31 and 33 to shield the tuner board. The location of the other boards about the exterior of these walls is basically a matter of mechanical design and electrical considerations.

Returning now to the control employed to properly polarize the incoming wave, as previously indicated, this specific mechanism forms the subject matter of U.S. Pat. No. 4,375,052. For completeness of the present application, however, a brief description of the mechanism is undertaken. The motor 23 drives a sprocket 38, which in turn drives a belt 39, disposed in a groove 45 about collar 24. A plurality of pins 41, 42, 43, 44, and 46 are located in the collar 24; the pins 44 and 46 being rigidly secured in the collar and the pins 41-43 being located in slots in the collar. All of the pins are located in slots in the feed, the slots in the collar being generally designated by the reference numeral 47 in FIG. 4 of the accompanying drawings. The collar 24 is rotatable through 90° and upon rotation of the collar, the pins 44 and 46 are also rotated 90° while pins 41-43 are rotated varying degrees depending upon the length of their respective slots.

The pins 44 and 46 are also located at 45° relative to pins 48 in stationary positions in the feed. Thus, the pins 41-43 are utilized to rotate the polarized incoming wave 45° in one direction or the other to produce alignment with pins 48. The angle between the pins 48 and 44-46 is divided into 4 segments of 11.25° each and each of the slots 47 is proportioned accordingly.

Figure 4:
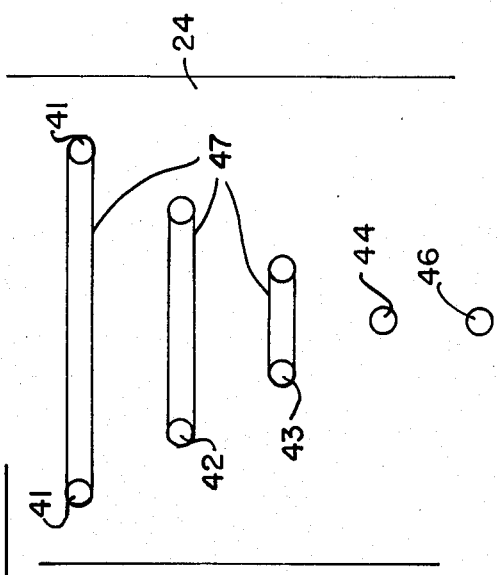
FIG. 4 is an exterior view of the polarity changing arrangement of the feed of FIG. 2.

Referring to FIG. 4, the slot associated with pin 41 subtends a 67.5° arc, the slot associated with pin 42, a 45° arc and the slot associated with pin 43, a 22.5° arc. Thus, upon rotation of the collar 24 to one extreme of rotation or the other, the pins 44 and 46 lie at 45° to the pins 48 and the pins 41-43 are distributed at equally spread intervals about the 45° arc.

The guide 10 has slots, not illustrated, corresponding to the slots 41 in the collar and has 2 additional 90° slots to accommodate movement of pins 44 and 46. The slots in the guide are covered by the collar 24 providing protection against electrical and magnetic interference.

Thus, the pins rotate the 90° polarized wave into the plane of the pins 48 (see FIG. 2A) where the wave is presented to transition section 51 of the guide 10 and presented to the coaxial or other appropriate input to the low noise amplifier 8. The control of the stepper motor 23 is discussed in detail subsequently.

The housing 3 constitutes a double walled, hollow cylindrical container which is utilized not only for purposes of keeping out the weather but also for heat insulation. It must be realized that when the center of the antenna, the satellite and the sun become aligned, which happens twice a year and although only briefly, the heat generated on the outer surface of the container 3 can be very great. A double walled container in conjunction with the thick wall 40, which is located behind the side lobe suppressor 24 have proven sufficient to maintain the temperature within the housing at acceptable limits.

The double walled container is arranged such that air may and does circulate between the walls 52 and 53; wall 53 being of a heat insulating material and wall 52 being a metallic member for electrical and magnetic interference shielding. The wall 53 is provided with three generally right angle indentations 5 located at 120° about the periphery of the intersection of the top and cylindrical walls. The indentations 5 contact the adjacent regions of the wall 52 and serve as spacers between the walls. A series of holes 50 are provided in the top of the container 53 to assist in air circulation.

The housing is provided with a cable connector or bushing 54 through which the power and control cables enter and the output signal cable exits from the interior of the housing.

The need for the channel entry button 22 at console 16 now becomes apparent. The thumb wheels of selector 21 select, for instance, first an odd and then an even and then an odd, etc. channel. The odd and even channels are oppositely polarized and each time the channels are changed, the stepper motor would, if directly connected to the selector, attempt to change the position of the collar 24 with each step of the selector. Such operation would place a great strain on the motor and certainly hasten its burn out. The entry button prevents this by applying the channel information to the motor control only after the channel selection has been made so that the motor is not energized if the channel now selected is of the same polarization as the previous channel or the motor operates only once to change the polarization, if the channel is different. It is also apparent that since the channels are alternately polarized, all even channels have one polarization and all odd channels have the other polarization. This feature is used in the motor control circuit to determine whether a change is required, as is described subsequently.

Figure 3:
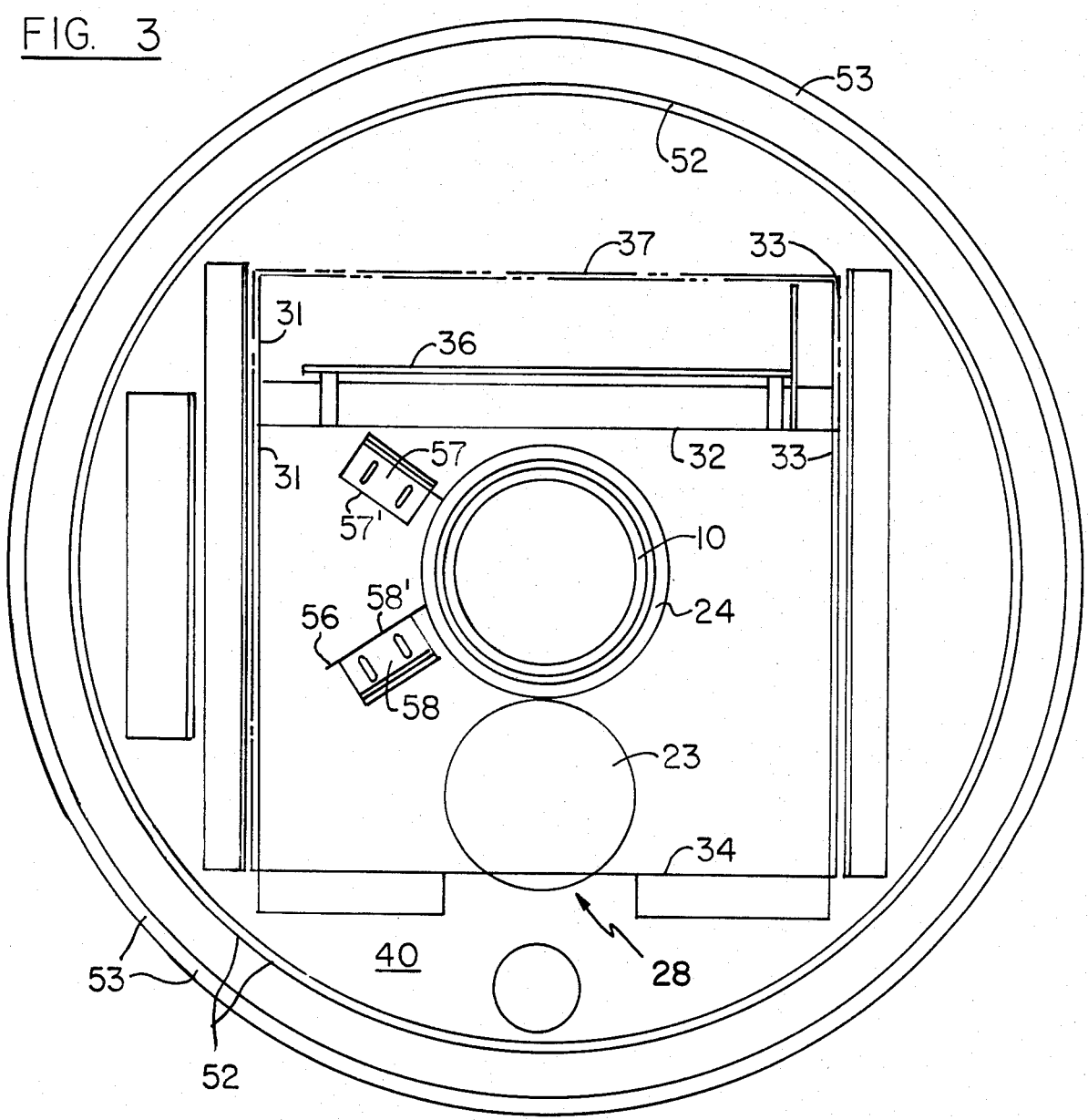
FIG. 3 is a top view of the housing taken along line 3—3 of FIG. 2.

The motor controller, as will become apparent, removes all voltage from the motor when it is quiescent. In order to prevent the collar 24 from moving and producing signal degradation magnetic detenting is employed. Referring specifically to FIG. 3, two magnets 57 and 58 are located so as to provide faces 57' and 58' of the magnets at 90° relative to one another with the center line of collar 24 as the center of the arc. A blade 56 of magnetically permeable material is secured to the collar 24 and rotates therewith. At each extreme position of the collar, the blade contacts one of the magnetic surfaces 57' or 58' and is held there until the motor is energized; thereby detenting the collar.

Figure 5:
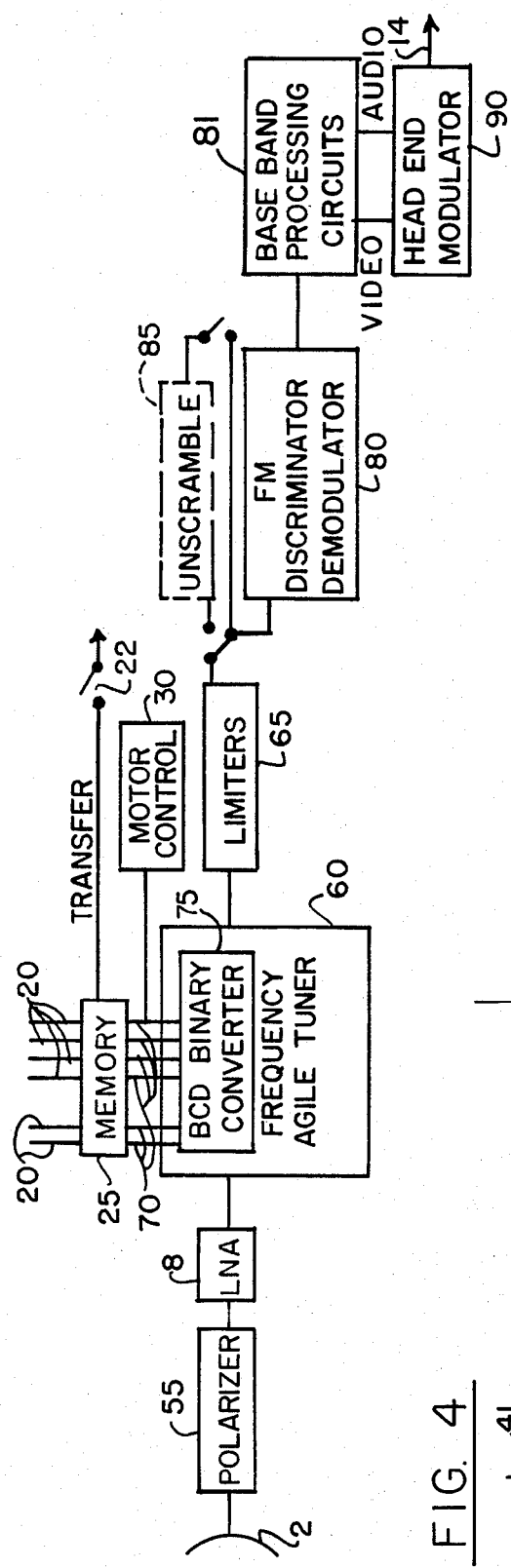
FIG. 5 is a block diagram of the electronic system employed in the present invention.

Referring now specifically to FIG. 5 of the accompanying drawings, there is illustrated a block diagram of the electronics employed to accomplish the purposes of the present invention. The system includes an antenna 2 for supplying a properly polarized signal via polarizer 55 (U.S. Pat. No. 4,375,052) to the LNA 8. Thus, only signals of every other channel are passed to the LNA with about 40 MHz separation between carriers.

The LNA 8 supplies the properly polarized signals, in the 3.72 GHz to 4.18 GHz range to the tuner of the frequency agile tuner 60 (U.S. Pat. No. 4,387,393) which detects the signals on the selected channels and applies them at a 70 MHz IF frequency to a series of high gain, hard limiters 65. The channel selected by the tuner 60 is under control of the console 16 which supplies binary coded decimal signals via leads 20, within cable 14, to a memory 25 for transfer via leads 70 to a binary coded decimal to binary converter 75 included in the receiver.

The limiters supply the FM signal to the FM discriminator-demodulator 80, the output of which contains FM audio and AM video information. The demodulator 80 is preferably of the type forming the subject matter of copending patent application Ser. No. 782,202 in the name of Lennox, et al filed on Mar. 28, 1977, now U.S. Pat. No. 4,288,876 for Demodulator for Frequency Modulated Signals, and assigned to the assignee of the present invention. The demodulator provides improved noise performance relative to prior art apparatus and as previously indicated, reduces the need for threshhold extension while substantially reducing sparkle and impulse noise problems.

If a signal scrambler is employed at the transmitting end of the communications system, then an unscrambler 85 may be inserted between the limiters 65 and demodulator 80. The unscrambler is inserted in this section of the system so that inexpensive techniques may be employed for such purposes as is explained subsequently.

The output signal from the demodulator 80 is supplied to base band processing circuits 81 for separation of video and audio signals. The signals are supplied to a head end modulator 90 for producing a video modulated carrier and an audio modulated subcarrier for application to cable 14 interconnecting the control console and the antenna.

Figure 6:
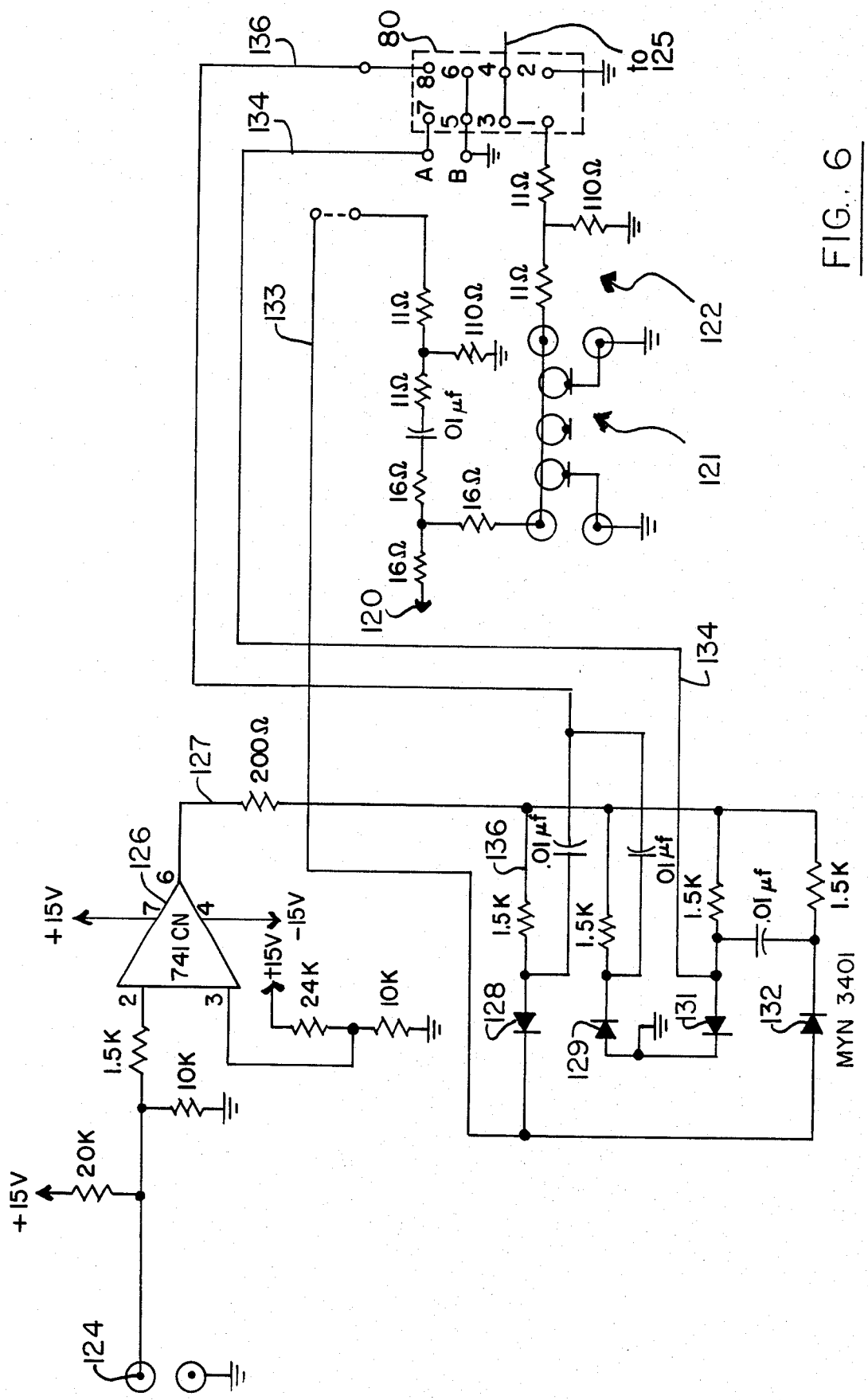
FIG. 6 is a schematic diagram of the unscrambler of the present invention.

In those systems in which scrambling is employed and is of the form previously indicated, an unscrambler 85 is inserted between the limiters 65 and the demodulator 80. The unscrambler is illustrated in FIG. 6 of the accompanying drawings and reference is now made to that Figure. The signal appearing at the output of the limiters 65 is applied in FIG. 6 to a terminal 120 of the unscrambler 85 and the output of the unscrambler 85 is applied to input terminal 1 of the demodulator 80 as illustrated in FIG. 6.

The signal at the terminal 120 is applied to a terminal 1 of the demodulator 80 via a $\frac{3}{4}$ wave length delay line generally designated by reference numeral 121 and thence through a T-pad 122 to a terminal 1. The $\frac{3}{4}$ wave delay line is employed to shrink the peak to peak separation of the signal to improve the overall sensitivity of the demodulator and thus provide better performance and forms a novel feature of the aforesaid Pat. No. 4,288,876. The signal on terminal 120 is also normally applied to pin 7 of the demodulator 80 while the pin 8 is normally grounded. The primary winding, designated by reference numeral 125, of the input transformer of the demodulator is connected between input terminals 7 and 8 thereof and in accordance with the present invention, the signal on terminal 120 is applied to pin 7 or pin 8 depending upon whether the signal is unscrambled or scrambled, respectively. Thus, in order to effect the signal reversal in the event of receipt of a scrambled signal, the terminals 7 and 8 are in effect, switched; that is the terminal 7 is grounded and the signal is applied to the terminal 8. This is accomplished by that part of the circuit in FIG. 6 enclosed within a dashed box and having reference numeral 85 applied thereto.

A d.c. control signal applied to a terminal 124 and through amplifier 126 to a lead 127 is employed for controlling conduction of two of four diodes 128, 129, 131, and 132. The 70 MHz signal on the terminal 120 is applied via a lead 133 to the diode network and leads 134 and 136 connect the terminal 7 and 8 respectively to the diode network.

In operation, if a positive voltage appears on the lead 127, the diodes 128 and 131 are rendered conductive, in which case the signal on lead 133 is applied to the lead 136 and thence the terminal 8 while the terminal 7 via lead 134 and diode 131 is grounded. In this instance, the signal is reversed in that, the ground is applied to terminal 7 whereas in FIG. 7 the terminal 8 is grounded and the signal is applied to the terminal 7.

If a negative voltage appears on the lead 127, the diodes 129 and 132 are rendered conductive and the signal appearing on lead 133 is applied to the terminal 7 via the diode 132 while the terminal 8 is connected to ground through the now conducting diode 129.

Thus, by simple pin diode network and control 123, the signal may be readily unscrambled by the use of a low voltage d.c. which may be no more than 5 to 15 volts applied to the terminal 124. By effecting the unscramble control at RF frequencies, inexpensive. pin diodes may be employed rather than expensive relays and drivers, etc. that would be required if the conversion were made at video frequencies.

The control signal applied to amplifier 126 may be locally or remotely generated. In the former case, lack of reception of correct video on a selected channel may indicate a scrambled signal. The console 16 may be provided with an additional two pole switch which when positioned in the unscramble mode applies an appropriate positive signal to the amplifier 126 to reverse polarity and unscramble the information signals. In remote control operation, a subcarrier tone may be transmitted and upon detection produce the desired control signal.

The output signal from the demodulator 80 contains both video and audio components. This signal which appears across resistor 125 is applied to the base band processing circuits 85 which are conventional and thus are not described.

Figure 7:
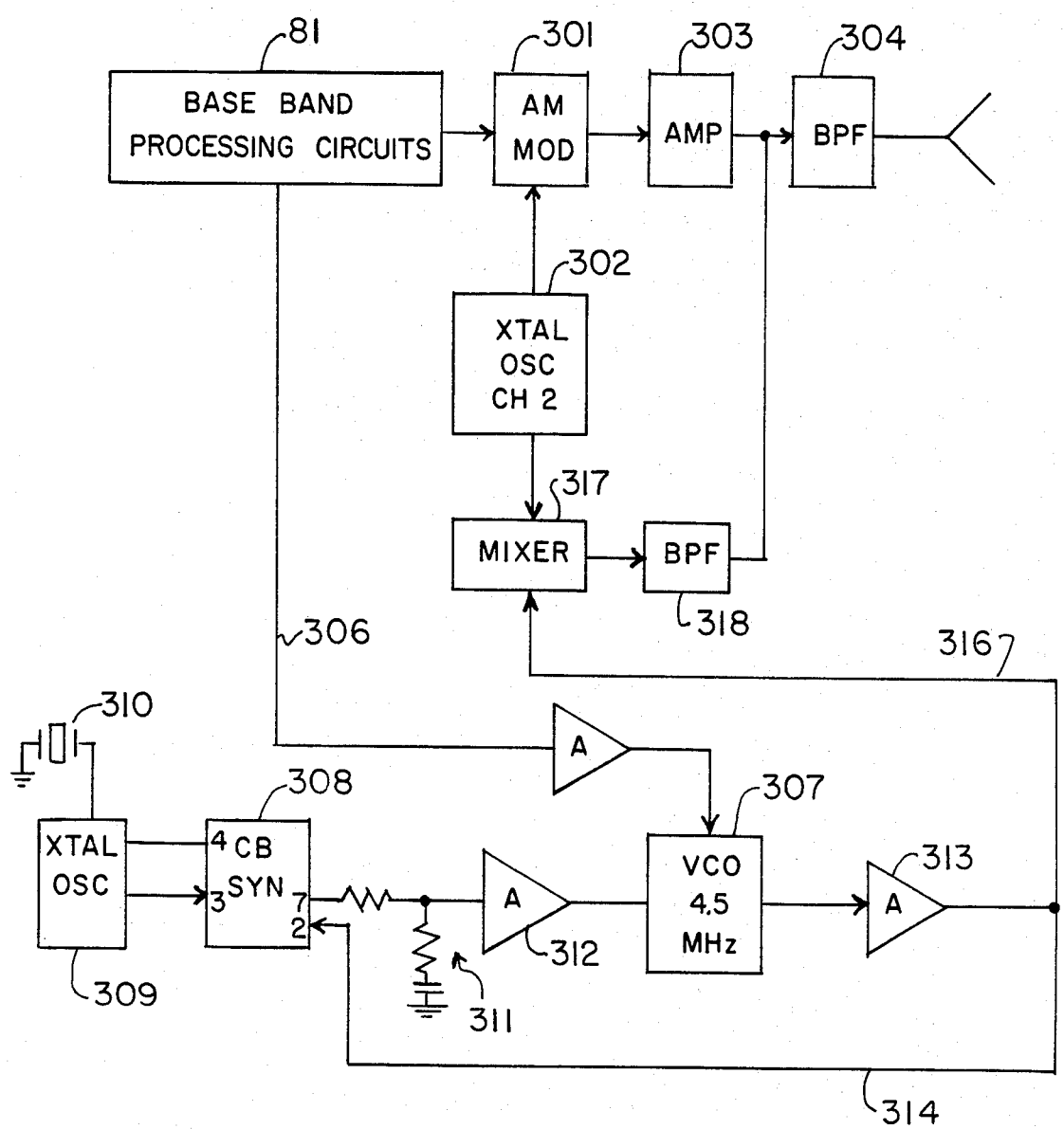
FIG. 7 is a block diagram of the head-end modulator of the present invention.

To complete the receive station signal processing function, a head end modulator is provided to produce video and audio signals in a form which may be directly utilized by the TV receiver. Referring specifically to FIG. 7 of the accompanying drawing, there is illustrated a head-end modulator suitable for use in such system.

The video output of the demodulator 80 is applied to an AM modulator 301 which receives a local oscillator frequency of 55.25 MHz from oscillator 302. The AM carrier is amplified in amplifier 303 and passed through band pass filter 304 to the cable 14.

The audio output of demodulator 221 is applied via lead 306 to a frequency control input terminal of a 4.5 MHz VCO 307 to provide a frequency modulated 4.5 MHz audio subcarrier output. It is essential that the subcarrier frequency be maintained substantially constant and thus it is included in a phase lock loop with a CB synthesizer arrangement including chip 308, oscillator 309 and frequency control crystal 310. The d.c. output oscillator control voltage from the chip 308 is applied to the voltage control terminal of the VCO 307 via a loop filter 311 and amplifier 312.

The modulated subcarrier is amplified by amplifier 313; the output of which is applied via lead 314 to terminal 2 of the chip 308 to complete the phase lock loop. The operation of the CB synthesizer is identical with that of the tuner except that since only a fixed frequency is required, the channel selection feature is omitted. It should be noted that the inclusion of the VCO 307 in a phase lock loop including a crystal controlled oscillator reference provides the requisite stability required of this sub system.

The amplifier 313 also supplies an output signal on lead 316 to a mixer 317 to produce the audio carrier at 59.75 MHz. The frequency modulated audio subcarrier is applied to the cable 14 via a band pass 318 and the band pass filter 304.

Figure 8:
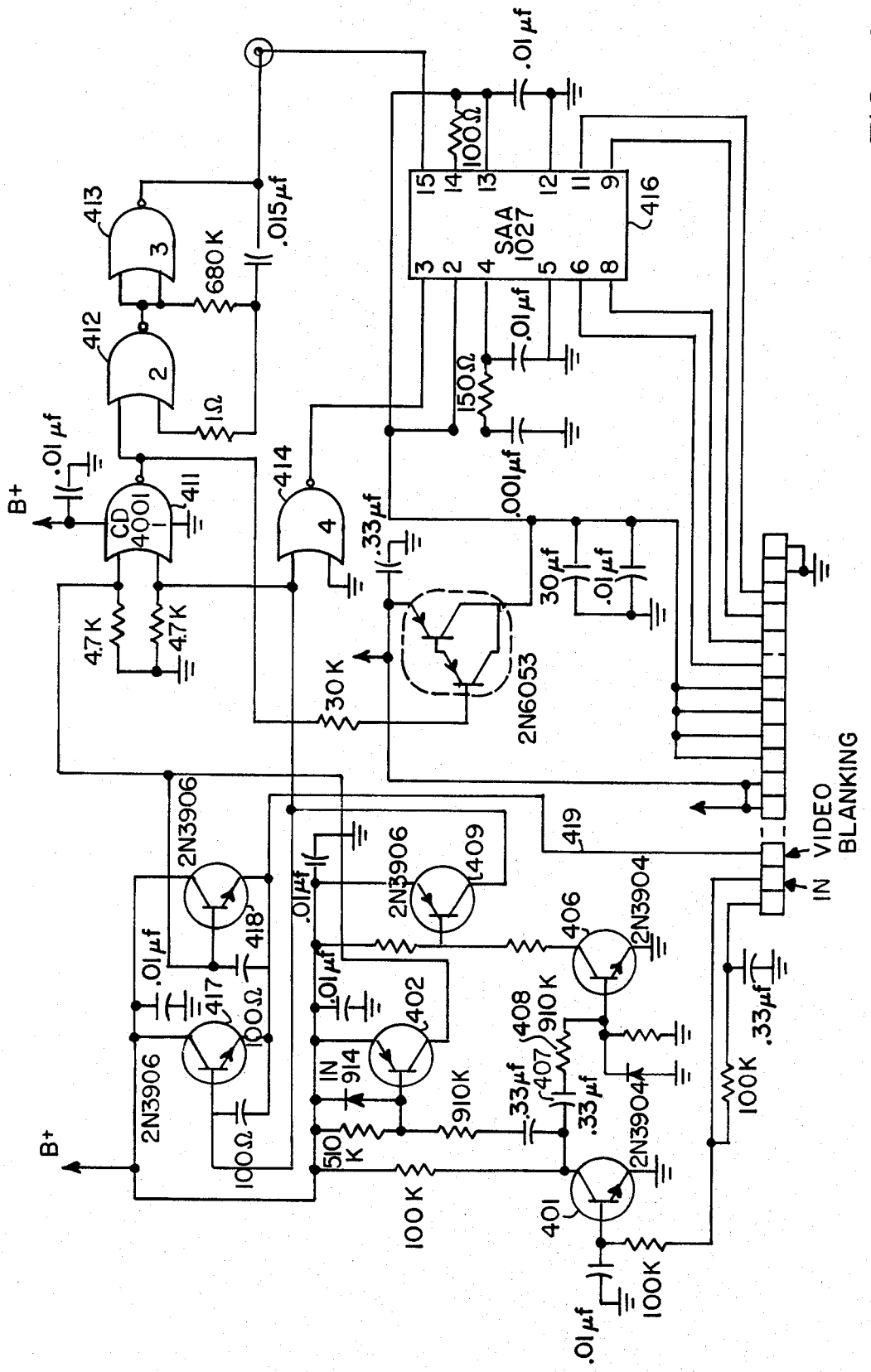
FIG. 8 is a circuit diagram of the controller for the feed polarization control motor of the apparatus.

Referring now specifically to FIG. 8 of the accompanying drawings, the circuit for controlling motor 23 of the antenna polarizing control is illustrated.

High-low signals indicating an odd or even channel are applied to pin 15; the high signal or binary 1 indicating an odd channel and the low signal or binary 0 indicating an even channel.

Pin 15 is connected to the base of transistor 401. The collection of transistor 401 is connected to the base of transistor 402 via a 1 second delay circuit comprising capacitor 403 and resistor 404.

The collector of transistor 401 is also connected to the base of transistor 406 via a 1 second delay circuit comprising capacitor 407 and resistor 408. The collector of transistor 406 is connected to base electrode of transistor 409 having its collector connected to pin 2 of NOR-gate 411 which is one of four NOR gates 411, 412, 413 and 414 of chip CD 4001 AF. The collector of transistor 402 is connected to pin 2 of the NOR-gate 411. The collector of the transistor 409 is also connected to pin 5 of NOR-gate 414.

The circuit of FIG. 8 thus far described forms the circuit for selecting the direction of rotation of the motor 23 if the motor is required to run and for maintaining the motor deenergized at all times that polarization of the feed is not to be changed. Specifically, the transistor 401 remains in a condition as determined by the last information provided. Thus, if the last signal supplied was high, transistor 401 remains on and vice versa so that if the information supplied over cable 14 to pin 3 of FIG. 8 does not change, the motor control circuit remains dormant.

If a change of polarization is required and the signal at pin 3 changes conduction of transistor 401, then the voltage at the collector changes and a signal is passed through time constant circuits 403-404 and 407-408 to transistors 402 and 406, rendering one conductive and holding the other non-conductive. Specifically, if the transistor 401 changes from non-conducting to conducting, the transistor 402 is rendered conductive for 1 second and a pulse is applied to pin 1 of NOR-gate 411 which passes the pulse to start operation of a clock comprised of NOR-gates 412 and 413 and cause Darlington circuit 414 to be rendered operative. The clock and Darlington circuits apply signals to pin 15 and pins 13 and 14, respectively, of motor control circuit 416 supplied by the manufacturer of the specific stepper motor employed.

If the transistor 401 changes from conducting to non-conducting, the transistor 409 is rendered conductive and the NOR-gate 411 is again pulsed and the clock again runs for 1 second.

The transistor 409 also pulses NOR-gate 414 which determines the direction of rotation of the motor 23. Specifically, whenever gate 414 applies a voltage to pin 3 of the control circuit 416, the motor runs in one direction but if such a voltage is not present on pin 3, the motor runs in the other direction.

Thus, the circuits described determine if the motor is required to run and if so, in what direction.

Completing the description of FIG. 8, it would be annoying if the video were being displayed during rotation of the antenna feed. Thus, video blanking is provided via transistors 417 and 418 operating as emitter followers to a common line 419. The transistor 417 is driven by transistor 409 and the transistor 418 by the transistor 402. Lead 419 is coupled via connector pin 3 to an amplifier in the demodulator circuit to prevent it from passing signals for the 1 second required for rotation of the antenna pin twist polarizer.

The motor 23 is supplied by North American Philips from which the chip SAA1027 is also available.

The concepts of the present invention are not restricted to use with a specific satellite but one equally applicable to reception of signals from various presently available sources and similar satellites to be launched in the future.

The various features employed render the apparatus inexpensive, efficient, easily installed and readily serviceable.

The apparatus employs several inventions of others which although preferred at this time, may be replaced in the future by more normal designs without affecting the basic concepts of this invention. Also, although the specific circuitry disclosed herein represents the best mode of producing the invention at this time, future improvements may be incorporated without affecting the basic concepts. For instance, different materials, a different motor, a different polarization rotation feed, etc. may be employed but the concept of a polarization rotary feed, all circuits located in a housing at the antenna focus, use of a single LNA, etc. is not affected by such changes.

Once given the above disclosure, many other features, modifications and improvements will become apparent to the skilled artisan. Such other modifications, features and improvements are, therefore, considered a part of this invention, the scope of which is to be determined by the following claims.

I claim:

1. An earth satellite ground station having an antenna with a focal point,
   an antenna feed adapted to be supported at the focal point of the antenna,
   a wave guide positioned to receive energy from said antenna feed,
   a housing disposed about said feed and said wave guide,
   a frequency agile receiver disposed within said housing for producing an IF signal,
   a lead, and
   means disposed within said housing for receiving said IF signal and producing modulated subcarrier signals on said lead for direct application to the audio and video signal processing circuits of a television set.

2. The apparatus according to claim 1 wherein said receiver is tunable to receive various selectable channels.

3. The apparatus according to claim 2 further comprising means located remote from said housing for selecting a channel to be received by said receiver.

4. The apparatus according to claim 3 wherein said wave guide has located therein means for selectively rotating complementarily polarized electromagnetic waves into a common plane of polarization.

5. The apparatus according to claim 4 wherein said means for selectively rotating comprises a variable pin twist,
   a motor located in said housing for varying said pin twist, and
   a motor control for said motor located in said housing.

6. The apparatus according to claim 3 further comprising
   means responsive to selection of a different channel by said means for selecting for blanking passage of video signals through said receiver.

7. The apparatus according to claim 1 further comprising a low noise amplifier located in said housing.

8. The apparatus according to claim 1 wherein said apparatus further comprises
   a plurality of metal walls disposed about and forming an open ended box about said wave guide,
   said housing being metallic and surrounding said walls, and a heat insulating shield surrounding said metallic housing.

9. The apparatus according to claim 8 further comprising
   a plurality of circuit boards mounted on said walls, and
   circuit components disposed on said circuit boards to define said receiver and said means for producing signals.

10. The apparatus according to claim 8 wherein said shield and said metal housing are spaced from one another such as to permit free circulation of air therebetween.

11. The apparatus according to claim 10 wherein said shield has an open end and a closed end, and
    a plurality of holes formed in said closed end whereby to permit air to pass from the open end through the closed end.

12. An earth satellite ground station having an antenna with a focal point, comprising,
    an antenna feed,
    a wave guide secured to and fed from said feed,
    a low noise amplifier for receiving electromagnetic wave energy from said wave guide, a receiver for receiving signals from said low noise amplifier and producing IF signal, a demodulator for receiving and demodulating the IF signals, a signal processing circuit connected to receive demodulated signals from said receiver for separating audio and video signals, a head end modulator connected to receive audio and video signals from said signal processing circuit, said head end modulator processing said audio and video signals for utilization directly by the audio and video circuits of a conventional television set, a plurality of circuit boards disclosed about said wave guide, said circuit board having components thereon defining said receiver, said demodulator, said signal processing circuit and said head end modulator, said antenna feed adapted to be located at the focal point of the antenna.

13. The apparatus according to claim 12 wherein said wave guide includes a variable pin twist for rotating complementarily polarized waves into a common plane, a motor for rotating said pin twist, a control for said motor mounted on said circuit boards, said motor being disposed adjacent said wave guide, and a housing disposed about said circuit boards, said motor and said wave guide.

14. The apparatus according to claim 13 wherein said receiver is tunable to various channels.

15. The apparatus according to claim 14 further comprising a console adapted to be located remote from said ground station, said console including means for selecting satellite or local television transmission, means for selecting channels for said tunable receiver, and means for controlling introduction of channel selection information into said receiver after channel selection.

16. The apparatus according to claim 12 or claim 13 further comprising a signal unscrambler mounted on one of said circuit boards, for producing an unscrambled signal and means for selectively inserting said unscrambled signal into said circuit.

17. The apparatus according to claim 14 wherein said receiver is tunable to odd and even channels and wherein said motor is reversible means for generating a code having a least significant digit representing an odd and an even channel, said control including means responsive to said least significant digit to cause said motor to rotate in a specified direction upon a change from odd to even in said digit and to run in the opposite direction upon a charge from even to odd in said digit.

18. A station for receiving radio waves having an antenna with a focal point, an antenna feed adapted to be supported at the focal point of an antenna, a wave guide positioned to receive energy from said antenna feed, a housing disposed about said feed and said wave guide, a receiver disposed within said housing, a lead for receiving information bearing signals, a modulator disposed within said housing for producing information bearing signals on said lead, a plurality of walls disposed about said wave guide, said housing being of metal and surrounding said walls, a heat insulating shield surrounding said housing, a plurality of circuit boards mounted on said walls, and circuit components disposed on said circuit boards to define said receiver and said modulator.

19. The apparatus according to claim 18 further comprising a low noise amplifier located in said housing and disposed in the signal path between said antenna feed and said receiver.

20. The apparatus according to claim 18 wherein said wave guide includes:

a variable pin twist for rotating complementarily polarized waves into a common plane, a motor for rotating said pin twist, a control for said motor mounted on said circuit boards, said motor being disposed adjacent said wave guide, and said housing disposed about said circuit boards, said motor and said wave guide.

* * * * *